US012277770B2

(12) United States Patent
Sachdeva et al.

(10) Patent No.: US 12,277,770 B2
(45) Date of Patent: Apr. 15, 2025

(54) ASSEMBLY MONITORING SYSTEM

(71) Applicant: Invisible AI Inc., San Francisco, CA (US)

(72) Inventors: Prateek Sachdeva, San Francisco, CA (US); Eric Danziger, Fairfax, CA (US)

(73) Assignee: Invisible AI Inc., South San Francisco, CA (US)

( * ) Notice: Subject to any disclaimer, the term of this patent is extended or adjusted under 35 U.S.C. 154(b) by 795 days.

(21) Appl. No.: 17/487,942

(22) Filed: Sep. 28, 2021

(65) Prior Publication Data

US 2022/0101016 A1 Mar. 31, 2022

Related U.S. Application Data

(60) Provisional application No. 63/085,606, filed on Sep. 30, 2020.

(51) Int. Cl.
| | | |
|---|---|---|
| *G06V 20/52* | (2022.01) | |
| *G06T 7/00* | (2017.01) | |
| *G06T 7/73* | (2017.01) | |
| *G06V 10/20* | (2022.01) | |
| *G06V 10/22* | (2022.01) | |
| *G06V 10/94* | (2022.01) | |

(52) U.S. Cl.
CPC ............ *G06V 20/52* (2022.01); *G06T 7/0004* (2013.01); *G06T 7/73* (2017.01); *G06V 10/235* (2022.01); *G06V 10/255* (2022.01); *G06V 10/95* (2022.01); *G06T 2207/30164* (2013.01)

(58) Field of Classification Search
CPC .... G06V 20/52; G06V 10/235; G06V 10/255; G06V 10/95; G06V 20/70; G06T 7/0004; G06T 7/73

USPC ......................................................... 382/103
See application file for complete search history.

(56) References Cited

U.S. PATENT DOCUMENTS

| | | |
|---|---|---|
| 2008/0116051 A1 | 5/2008 | Miller et al. |
| 2010/0088256 A1 | 4/2010 | Ristow et al. |
| 2011/0231787 A1 | 9/2011 | Tseo et al. |

(Continued)

FOREIGN PATENT DOCUMENTS

WO 2017134519 A1 8/2017

OTHER PUBLICATIONS

Li, Ch.G., et al., Automated visual positioning and precision placement of a workpiece using deep learning. Int J Adv Manuf Technol 104, 4527-4538 (2019). https://doi.org/10.1007/s00170-019-04293-x.

(Continued)

*Primary Examiner* — Ayodeji O Ayotunde
(74) *Attorney, Agent, or Firm* — Patent Law Works LLP

(57) ABSTRACT

A system and method for receiving, using one or more processors, image data, the image data including a first training video representing performance of one or more steps on a first workpiece; applying, using the one or more processors, a first set of labels to the first training video based on user input; performing, using the one or more processors, extraction on the image data, thereby generating extracted information, the extracted information including first extracted image information associated with the first training video; and training, using the one or more processors, a process monitoring algorithm based on the extracted information and the first set of labels.

20 Claims, 8 Drawing Sheets

(56) References Cited

U.S. PATENT DOCUMENTS

2014/0272838 A1    9/2014  Becker
2015/0294483 A1   10/2015  Wells
2018/0182088 A1*   6/2018  Leordeanu ............... G06T 7/60
2020/0401851 A1* 12/2020  Mau ................... G06F 18/2413

OTHER PUBLICATIONS

PCT International Search Report and Written Opinion; Application No. PCT/US2021/052428 Invisible AI Inc., International filing date of Sep. 28, 2021, date of mailing Feb. 11, 2022, 7 pgs.

Chen, Chengjun, et al. "Repetitive Assembly Action Recognition Based on Object Detection and Pose Estimation." Journal of Manufacturing Systems, vol. 55, May 16, 2020, pp. 325-333, doi: 10.1016/j.jmsy.2020.04.018.

Andrianakos, George, et al. "An Approach for Monitoring the Execution of Human Based Assembly Operations Using Machine Learning." Procedia CIRP, vol. 86, 2019, pp. 198-203, doi: 10.1016/j.procir.2020.01.040.

* cited by examiner

Figure 3

ASSEMBLY MONITORING SYSTEM

CROSS-REFERENCE TO RELATED APPLICATIONS

The present application claims priority to U.S. Provisional Application No. 63/085,606, filed Sep. 30, 2020, titled "Assembly Monitoring System," the entirety of which is hereby incorporated by reference.

BACKGROUND

The present disclosure relates to systems and methods for monitoring one or more processes. The ability able to train workers to accurately and efficiently repeat a process and then accurately and efficiently repeat that process is important to a variety of industries and verticals. Presently, assembly processes are documented using job instruction sheets (JIS). The JIS is how most modern manufacturers document their assembly work. Typically, these JIS documents are at the workstations to remind the operators if needed, and new operators are trained using a JIS. However, the JIS system is archaic and limited.

SUMMARY

In general, an innovative aspect of the subject matter described in this disclosure may be embodied in methods that include receiving, using one or more processors, image data, the image data including a first training video representing performance of one or more steps on a first workpiece; applying, using the one or more processors, a first set of labels to the first training video based on user input; performing, using the one or more processors, extraction on the image data, thereby generating extracted information, the extracted information including first extracted image information associated with the first training video; and training, using the one or more processors, a process monitoring algorithm based on the extracted information and the first set of labels.

Other implementations of one or more of these aspects include corresponding systems, apparatus, and computer programs, configured to perform the actions of the methods, encoded on computer storage devices. These and other implementations may each optionally include one or more of the additional features.

These and other implementations may each optionally include one or more of the following features. For instance, applying the first set of labels to the first training video based on user input further may include: receiving, from a user, a plurality of bounding box sets, where each bounding box set is associated with a single workpiece, the first set of labels including a first bounding box set; training an object detection algorithm based on the plurality of bounding box sets, where the extraction includes applying the object detection algorithm, and the extracted image information includes an object detection. For instance, the first bounding box set may include a first bounding box around the first workpiece in a start frame, a second bounding box around the first workpiece in an intermediate frame, and a third bounding box around the first workpiece in an end frame, where training the object detection algorithm includes applying a deal learning object detection network. For instance, the first bounding box set represents a first workpiece at a beginning, at an intermediary stage, and at an end of a cycle in a camera device field of view. For instance, the method further comprises applying the first set of labels to the first training video based on user input further may include: receiving, from a user, a set of polygons, where the set of polygons includes one or more of a pick area polygon, a walk area polygon, and a pitch polygon, the first set of labels including the set of polygons. For instance, the method further comprises performing extraction on the image data generates one or more of pose data and an object detection. For instance, the set of labels may include a start frame label associated with a frame in which a step begins, an end frame label associated with a frame in which the step ends, and a step identifier identifying the step. For instance, the training of the process monitoring algorithm is further based on the second extracted information and the second set of labels. For instance, the method may include: subsequent to training the process monitoring algorithm, receiving live video image data; performing extraction on the live video image data, thereby generating live video extracted information; applying the process monitoring algorithm to the live video using the live video extracted information; and presenting step data. For instance, performing extraction on the live video image data may include obtaining pose data and an object detection, where applying the process monitoring algorithm and presenting the step data may include: applying the process monitoring algorithm to first live video extracted data associated with a first time and generating a first belief; presenting first step data including the first belief, the first belief including a step identifier and whether the step is complete; applying the process monitoring algorithm to second live video extracted data associated with a second time and generating a second belief by updating the first belief; and presenting second step data including the second belief.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 3 is an example illustration of a job instruction sheet.

DETAILED DESCRIPTION

Figure 1:
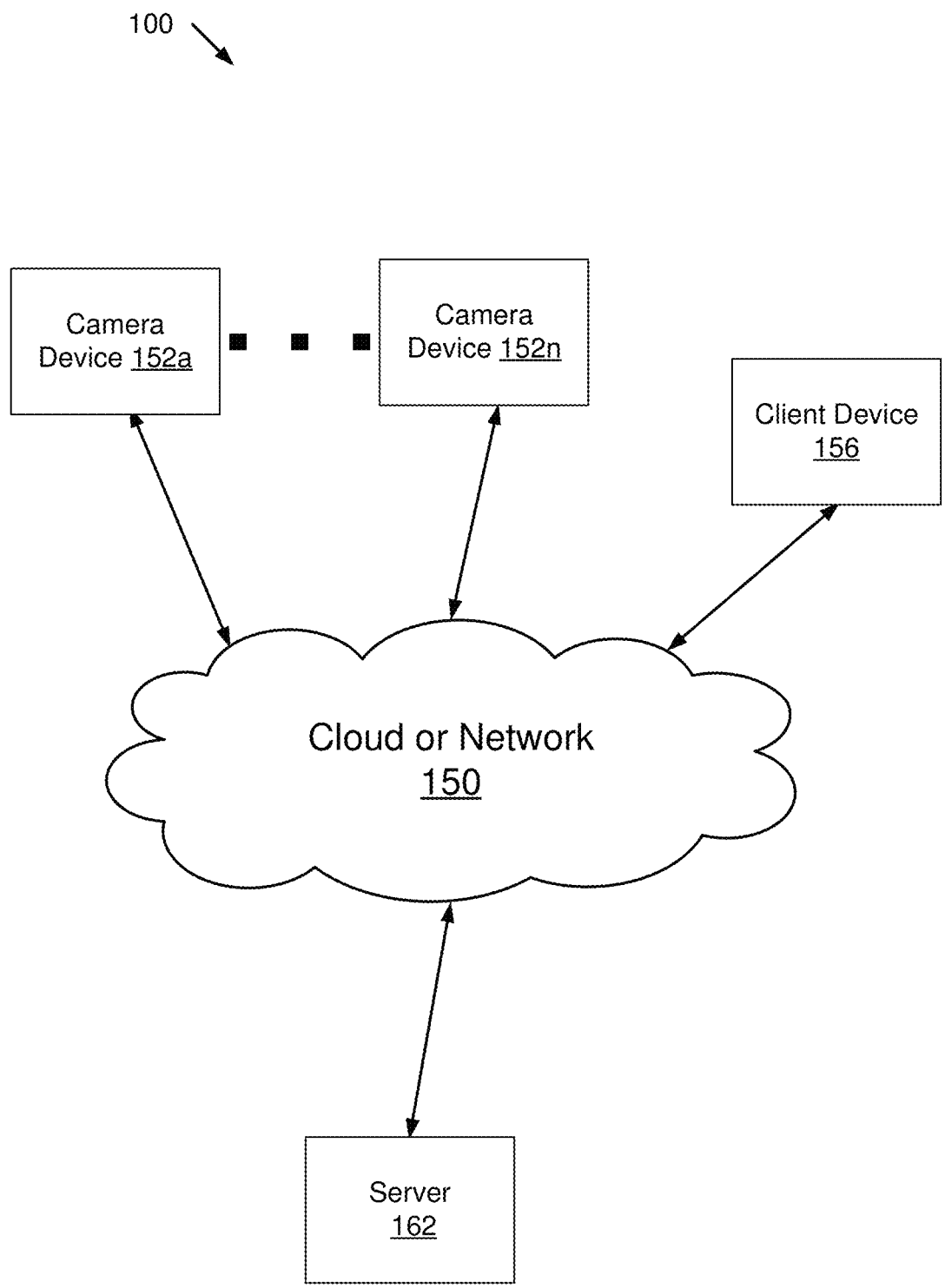
FIG. 1 is a block diagram of an example implementation of a system for assembly monitoring according to one implementation.

The present disclosure relates to systems and methods for monitoring an assembly process. Monitoring an assembly process includes many challenges and there are a number of unmet needs. First, present mechanisms, such as JIS, do not provide real-time feedback to indicate when a step has been skipped or performed out of order. Second, present systems lack an effective tracking mechanism to identify the root-cause of assembly errors. For example, present systems require a person to comb over large amounts of video (if they even have video) to try to determine who may have worked on a faulty unit and how the error occurred. Third, present systems of assembly monitoring do not surface optimizations that could be made to increase assembly efficiency or provide other benefits (e.g., to reduce repetitive stress or injuries or maintain social distancing).

Using machine learning in an attempt to address the foregoing deficiencies presents a number of technical challenges. First, is the cold start problem. Existing machine learning mechanisms require large amounts of examples on which the algorithm may be trained and tested on. Gathering and labeling (if using supervised machine learning) sufficient amounts of useable example data is challenging. This is particularly problematic for assembly processes, which may vary frequently for any number of reasons, such as right-handed vs left-handed workers, which are also occasionally referred to herein as "operators," rearrangement or reorientation of tools, parts, work stations, as the factory floor is rearranged, changes in product on same assembly line (e.g., 2WD vs 4WD transmission), etc. Second, the computational intensity of bandwidth utilization to generate and apply machine learning may make the application of machine learning impractical.

The techniques introduced herein overcome the deficiencies and limitations of the prior art at least in part by providing systems and methods for monitoring an assembly process. It should be understood that language used in the present disclosure has been principally selected for readability and instructional purposes, and not to limit the scope of the subject matter disclosed herein.

The present disclosure describes systems and methods for monitoring a process. In the following descriptions, for the purpose of explanation, numerous specific details are set forth in order to provide a thorough understanding of the present disclosure. However, it should be noted that the present disclosure might be practiced without these specific details. For example, while the monitored process may be referred to as an "assembly process," the workpiece may be undergoing assembly, disassembly, or modification. As another example, although the examples herein may refer to industrial assembly of workpieces that are articles of manufacture (e.g., an automotive transmission), it should be understood that the workpiece and the process being monitored may vary and include, by way of example and not limitation, a sandwich in a fast-food restaurant kitchen, a piece of anatomy undergoing a routine medical procedure, a routine maintenance or inspection process on a machine, etc.

FIG. 1 is a block diagram of an example system 100 for monitoring a process according to one implementation. In the illustrated example implementation, the system 100 includes a cloud or network 150, a camera devices 152*a-n*, client device 156, and a server 162. Although not shown, other IoT devices may also be coupled to the network 150 and interaction. A camera device 152*a/n* is described in more detail below with reference to FIG. 2.

The network 150 may be a conventional type, wired or wireless, and may have numerous different configurations including a star configuration, token ring configuration or other configurations. Furthermore, the network 150 may include a local area network (LAN), a wide area network (WAN) (e.g., the Internet), and/or other interconnected data paths across which multiple devices may communicate. In some implementations, the network 150 may be a peer-to-peer network. The network 150 may also be coupled to or includes portions of a telecommunications network for sending data in a variety of different communication protocols. In some other implementations, the network 150 includes Bluetooth communication networks or a cellular communications network for sending and receiving data including via short messaging service (SMS), multimedia messaging service (MMS), hypertext transfer protocol (HTTP), direct data connection, wireless access protocol (WAP), email, etc. In addition, although FIG. 1 illustrates a single network 150 coupled to the camera devices 152*a-n*, the client device 156 and the servers 162, in practice one or more networks 150 may be connected to these entities.

The client device 156 in FIG. 1 is used by way of example. Although one client device 156 is illustrated, the disclosure applies to a system architecture having any number of client devices available to any number of users (not shown). In the illustrated implementation, the client device 156 is communicatively coupled to the network 150 via respective signal lines. Additionally, it should be understood that there may be more, fewer, or different client devices than shown in FIG. 1. For example, the client device 156 can be any computing device that includes a memory and a processor. For example, the client device 156 can be a laptop computer, a desktop computer, a tablet computer, a mobile telephone, a smart phone, a personal digital assistant, a mobile email device, a portable game player, a portable music player, a television with one or more processors embedded therein or coupled thereto or any other electronic device capable of accessing the network 150, etc.

A client device 156 may include one or more of an application (not shown) or a web browser (not shown). In some implementations, a user (not shown) is presented a user interface associated with the assembly monitoring module 203, which is described below with reference to FIG. 2, and provides user input (e.g., labels) by interacting with the app or web browser on the client device 156, and at least a portion of those user inputs are provided to the assembly monitoring module 203 (or its subcomponents) to provide the functionality described herein.

The server 162 is illustrated by way of example. While a single server 162 is illustrated the disclosure applies to a system architecture having one or more servers 162 (virtual or physical), distributed (e.g., cloud) or local.

The camera devices 152*a* and 152*n* are illustrated by way of example. While two camera devices are illustrated, the description applies to any architecture with one or more camera devices 152.

Figure 2:
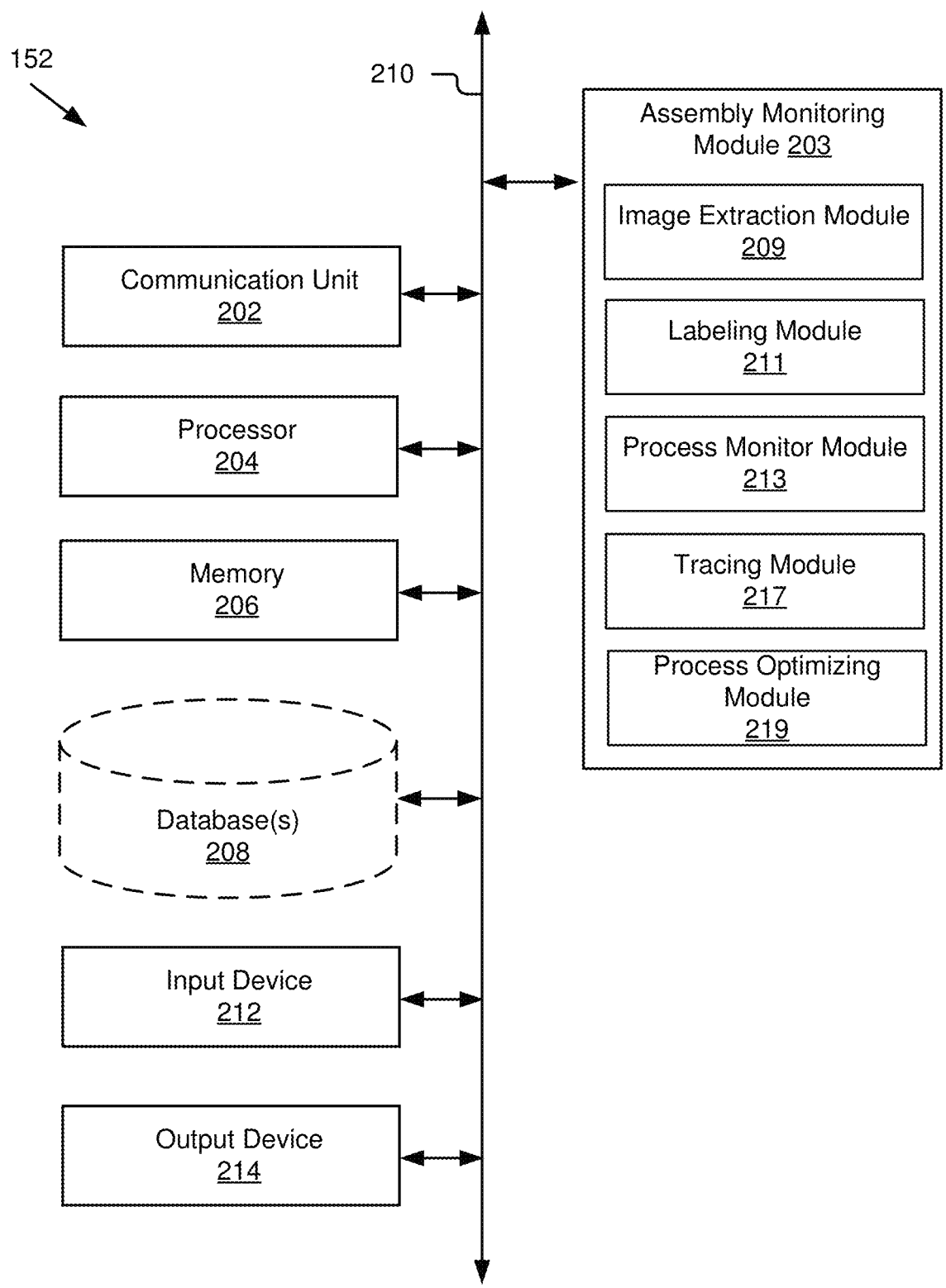
FIG. 2 is a block diagram of an example implementation of a camera device for assembly monitoring according to one implementation.

FIG. 2 is a block diagram of an example camera device 152. As illustrated in the figure, the camera device 152 may include a communication unit 202, a processor 204, a memory 206, database(s) 208, an input device 212, an output device 214, and an assembly monitoring module 203, which may be communicatively coupled by a communication bus 210.

The camera device 152 depicted in FIG. 2 is provided by way of example and it should be understood that it may take other forms and include additional or fewer components without departing from the scope of the present disclosure. For instance, various components of the camera device 152 may be coupled for communication using a variety of communication protocols and/or technologies including, for instance, communication buses, software communication mechanisms, computer networks, etc. While not shown, the camera device 152 may include various operating systems, sensors, additional processors, and other physical configurations. The communication unit 202, processor 204, memory 206, etc., are representative of one or more of these components.

The communication unit 202 may include one or more interface devices (I/F) for wired and wireless connectivity among the components of the system 100. For instance, the communication unit 202 may include, but is not limited to, various types of known connectivity and interface options. The communication unit 202 may be coupled to the other components of server 162 via the bus 210. The communication unit 202 can provide other connections to the network 150 and to other entities of the system 100 using various standard communication protocols.

In some implementations, the communication unit 202 includes a wired transceiver for exchanging data with other entities. In some implementations, the communication unit 202 includes a wireless transceiver for exchanging data with other entities, or any other communication channel using one or more wireless communication methods, such as IEEE 802.11, IEEE 802.16, BLUETOOTH® or another suitable wireless communication method.

In some implementations, the communication unit 202 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some implementations, the communication unit 202 includes a wired port (e.g., CAT 5 or 6, USB, Fiber, etc.) and a wireless transceiver. The communication unit 202 also provides other conventional connections to the network for distribution of files and/or media objects using standard network protocols such as TCP/IP, HTTP, HTTPS and SMTP as will be understood to those skilled in the art.

The processor 204 comprises an arithmetic logic unit, a microprocessor, a general-purpose controller, or some other processor array to perform computations and provide electronic display signals to a display device. The processor 204 may be coupled to the bus 210 for communication with the other components. The processor 204 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability might be enough to perform complex tasks, including various types of feature extraction and matching. It should be obvious to one skilled in the art that other processors, operating systems, sensors, displays and physical configurations are possible.

The memory 206 stores instructions and/or data that may be executed by processor 204. The memory 206 is coupled to the bus 210 for communication with the other components. The instructions and/or data may comprise code for performing any and/or all of the techniques described herein. The memory 206 may be a dynamic random-access memory (DRAM) device, a static random-access memory (SRAM) device, flash memory or some other memory device known in the art. In some implementations, the memory 206 also includes a non-volatile memory or similar permanent storage device and media such as a hard disk drive, a floppy disk drive, a CD ROM device, a DVD ROM device, a DVD RAM device, a DVD RW device, a flash memory device, or some other mass storage device known in the art for storing information on a more permanent basis. Although shown separately, the assembly monitoring module 203 may be stored in the memory 206 and cause the processor 204 to execute its functionality in some implementations.

The database(s) 208 may include information sources for storing and providing access to data, which may be used by assembly monitoring module 203. For example, the database(s) 208 may store one or more of video data (e.g., MP4, MPEG, AVI, etc.) video extraction data (e.g., pose data), labels (e.g., start and end frames), data obtained from a manufacturer's data acquisition and storage system(s) (not shown), etc.

In some implementations, database(s) 208 may store data associated with a database management system (DBMS) operable on the server 162. For example, the DBMS could include a structured query language (SQL) DBMS, a NoSQL DMBS, various combinations thereof, etc. In some instances, the DBMS may store data in multi-dimensional tables comprised of rows and columns, and manipulate, (e.g., insert, query, update and/or delete), rows of data using programmatic operations.

The database(s) 208 may be included in the camera device 152 or in another computing system and/or storage system distinct from but coupled to or accessible by camera device 152. For example, in some implementations, the database(s) 208 may be a network attached storage (not shown) communicatively coupled to the camera device 152 via network 150, or accessed via a third-party system. The database(s) 208 can include one or more non-transitory computer-readable mediums for storing the data. In some implementations, the database(s) 208 may be incorporated with the memory 206 or may be distinct therefrom.

The input device 212 includes an image/video capture device (e.g., camera). In some implementations, the input device 212 may include one or more peripheral devices. For example, the input device 212 may include a camera sensor, keyboard, a pointing device, microphone, a touch-screen display integrated with the output device 214, etc.

The output device 214 may be any device capable of outputting information. The output device 214 may include one or more of a display (LCD, OLED, etc.), a printer, a haptic device, an audio reproduction device, a touch-screen display, a remote computing device, etc. In some implementations, the output device is a display which may display electronic images and data output by a processor 204 for presentation to a user.

The bus 210 can include a communication bus for transferring data between components of a computing device or between computing devices, a network bus system including the network 150 or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The components 202, 203, 204, 206, 208, 212, and/or 214 may be communicatively coupled by bus 210 and/or processor 204 to one another and/or the other components of the server 162. In some implementations, the components 202, 203, 204, 206, 208, 212, and/or 214 may include computer logic (e.g., software logic, hardware logic, etc.) executable by the processor 204 to provide the actions and/or functionality described herein. In any of the foregoing implementations, these components 202, 203, 204, 206, 208, 212, and 214 may be adapted for cooperation and communication with processor 204 and the other components of the camera device 152.

As shown in FIG. 2, the assembly monitoring module 203 may include an image extraction module 209, a labeling module 211, a process monitoring module 213, a tracing module 217, and a process optimization module 219. These modules 209, 211, 213, 217, and 219 provide the functionality described below. It should be noted that the system 100 of FIG. 1 and camera device 152 of FIG. 2 are examples, and that the architecture may vary and components, features or functionality may be moved or reconfigured, and such variations are within the scope of this disclosure. For example, in some implementations, the tracing module 217 and/or processing module 219 may be server-based and located on server 162.

Figure 3:
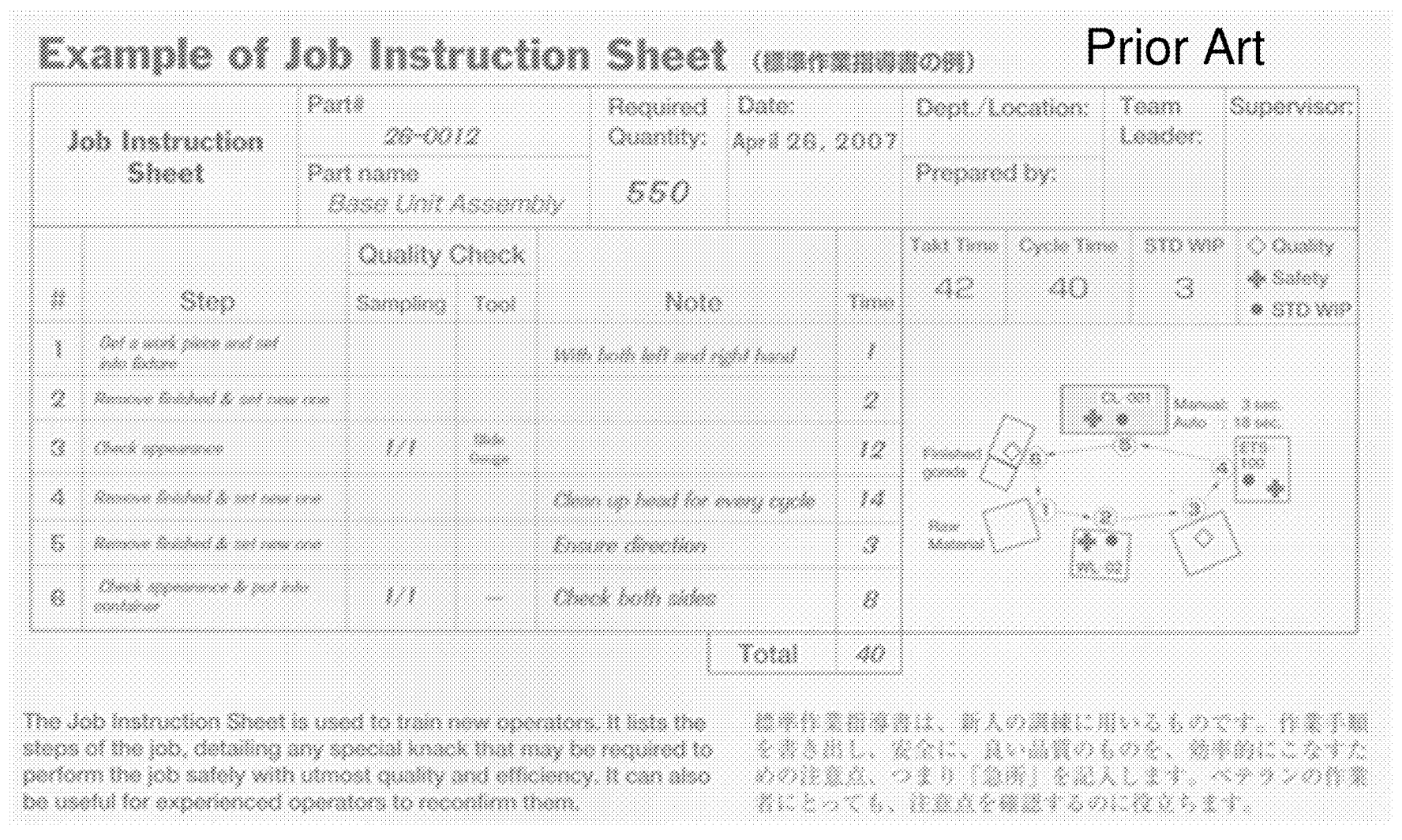

Presently, assembly processes are documented using job instruction sheets (JIS) an example of which is illustrated in FIG. 3. The JIS is how most modern manufacturers document their assembly work. Typically, these JIS documents are at the workstations to remind the operators if needed, and new operators are trained using a JIS. To summarize and simplify, a JIS is presently the ground truth for assembly today. However, the assembly monitoring system described herein replaces the archaic system of job instruction sheets.

In some implementations, the assembly monitoring module 203 includes an image extraction module 209, a labeling module 211, a process monitor module 213, a tracing module 217, and a process optimizing module 219.

The features and functionality of the foregoing modules of the assembly monitoring module 203 are described in detail below. However, a rough mapping of the modules 209, 211, 213, 217, 219 and their respective roles is as follows. The image extraction module 209 and labeling module 211 are used to pre-process data, for example, to create pose data, detect objects, and apply labels, respectively. The pre-processed data is used by the process training monitor 213 to train an algorithm, which the process training monitor 213 may then test and deploy. For example, the pre-processed data is provided to the process monitor module 213, which trains and deploys an AI, which identifies which step is being performed, and whether a step is skipped, and may prompt the assembler (e.g., alert him/her via an application (not shown) on a client device 156 at his/her work station of skipped step, step done out of order, step done incorrectly, etc.). The tracing module 217 and process optimizing module 219 perform post-processing. For example, the tracing module 217 provides traceability and visibility into the process allowing the root cause(s) of a mistake to be quickly and accurately identified, and the optimizing module 219 may provide suggestions for assembly optimization and efficiency gains to the person performing the assembly or another party (e.g., a manager).

The image extraction module 209 receives image data (e.g., video) and performs image extraction (e.g., to generate pose data or detect objects from the video). Examples of extraction include, but at not limited to pose estimation and object detection.

In some implementations, the image extraction includes object detection. For example, the image extraction module 209 detects whether a tool is present in an image (e.g., a video frame). Examples of tools may include, by way of example and not limitation, a drill, a wrench, a screwdriver, a hammer, a punch, pliers, etc. Detecting objects may allow discrimination between different steps that use different tools. In some implementations, tracking the objects may provide path information similar to pose estimation.

In some implementations, the image extraction module 209 trains and applies a deal learning object detection network to perform the object detection. However, other mechanisms for object detection exist and may be used depending on the implementation.

In some implementations, the object detection is trained based on a multi-bounding box approach using a number of bounding boxes, e.g., between two to ten bounding boxes inclusive per instance. For example, in some implementations, video of a process is presented during training of the object detection, and the user, using the labeling module 211 (described below), identifies three bounding boxes for training (i.e., a first bounding box around the workpiece in a start frame, a second bounding box around that workpiece in a frame approximately half way through performance of the step/cycle, and a third bounding box around the workpiece in the end frame); in some implementations, the image extraction module 209 obtains, as training data, multiple sets of the three bounding boxes, from a user labeling video of multiple instances of the process, and applies a deal learning object detection network to the sets of the three bounding boxes without any further labels. As used herein, a step may refer to a particular action (e.g., drill bolt 1) and a cycle refers to a set of actions that are supposed to occur at that workstation/portion of the assembly line/within the field of view of the camera device 152. In some implementations, a cycle may represent an entire process (i.e., all steps of a process) or a subset of steps in a larger process.

It should be recognized that, by using the multi-bounding box approach and the deal learning object detection network, the object detection may be accurate and reliable using orders of magnitude fewer training data. For example, the system and methods described herein may use training data describing, e.g., a dozen instances of the workpiece going through the cycle/step, whereas alternative methods may require thousands of instances to train and produce reliable results.

In some implementations, the image extraction includes applying pose estimation to the image data (e.g., video). In some implementations, the pose estimation, generated by the image extraction module 209, takes individual image frames and outputs pose data as an intermediate representation for either statistical methods or other deep learning methods (depending on the implementation). Tracking pose data may allow the system 100 to gather information about which step is currently being performed.

In some implementations, the image extraction module 209 generates a pose estimation on each image it receives (e.g., on successive video frames). In some implementations, the image extraction module 209 generates a full body pose for images including a human. For example, the image extraction module 209 generates a full body pose based on 17 key points.

In some implementations, the image extraction module 209 trains and applies a pose estimation neural network to perform the pose estimation. However, other mechanisms for pose estimation exist and are within the scope of this description.

It should be recognized that, in the illustrated implementation, the image extraction module 209 is illustrated within the camera device. While in some implementations, the pose estimation performed by the image extraction module 209 may be performed on a server or other hardware device(s), it should be recognized that the image extraction module 209 described herein may be efficient enough to run on the camera device 152 itself despite the limited hardware capacity of the camera device (e.g., processing power, memory, etc.) according to some implementations. Such implementations may result in a number of benefits particularly when many cameras are installed, as is likely to be the case in a large assembly facility. Benefits may include a reduction in bandwidth requirements (as cameras need not send data to a server for pose estimation), a reduction in cost (as less server and bandwidth resources need to be installed or made available), a reduction in latency (as the pose estimation occurs locally and distributed among the multiple cameras), an ability to cover a process, cycle, or step(s) from multiple angles using multiple cameras.

In some implementations, multiple camera devices 152 in the system 100 may cooperate and communicate. For example, in some implementations, multiple camera devices 152 cooperate within the system 100 to identify a step or missed step despite one camera not being able to view the step or process in its entirety (e.g., because one camera has an occlusion or obstructed view).

The labeling module 211 generates a workflow and a set of labels. In some implementations, the labeling module 211 defines steps in the workflow based on physical endpoints. For example, in some implementations, the labeling module 211 defines the steps of "grab bolts," "drive bolt 1," "drive bolt 2," "drive bolt 3," since each of these actions has a physical endpoint (e.g., where a bolt seats after being driven into place). By contrast, a JIS may have defined a "grab and drive bolts 1-3" as a single step.

In some implementations, the labeling module 211 labels a start frame, an end frame, a step identifier (e.g., a name or a number) and active key point(s). In some implementations, the key points are a subset of the key points from the key points used by the image extraction module 209 when performing the pose estimation. When a human is performing assembly, a key point associated with a hand (e.g., one or more fingers or a wrist) or an arm (e.g., an elbow) is often labeled as an active key point, since humans often assemble things with their hand(s). However, other active key points may be identified (e.g., pivot points on a robotic arm, or a foot for a foot actuated/operated device.

By labeling the start frame and end frame of a step, the process monitoring module 213, discussed further below, may derive one or more of a set of paths, endpoints, motion trajectory, or other behavioral interpretations of the tool being used or process being performed. Further the start and end frame labels indirectly represent the time taken to complete a step.

In some implementations, the labeling module 211 labels a pose (e.g., position and orientation) of a human. Depending on the implementation and/or use case, the pose labeled may be that of a limb, set of limbs, or whole body. The labeling of the human pose creates a correlation between a step and human posture.

In some implementations, the labeling module 211 labels a pose (e.g., position and orientation) of a tool. The labeling of the pose of a tool creates a correlation between a step and tool pose.

In some implementations, the labeling module 211 labels examples of a step with a category. In some implementations, the categories may correspond to how well and/or how quickly the step was performed. For example, the labeling module categorizes a step as ideal, anomalous, satisfactory, or terrible, or, alternatively, good, bad, or okay, to create baselines for process efficiency determination applications. In some implementations, steps may be labeled as "critical," and such steps may, when missed or skipped, generate an alert.

In some implementations, the labeling module 211 may define a bounding box around a worker or work station, to reduce noise and background movement and increase accuracy of the process monitor module 213 or its algorithm(s).

It should be recognized that while many of the examples discussed here are labels at the step-level, cycle-level labels are within the scope of this disclosure. For example, rather than, or in addition to, labeling a step (e.g., installing a bolt on a transmission) with a category, such as "good," a set of steps may be assigned a label (e.g., the entire assembly of a transmission may be labeled "good").

Labeling of examples with a category based on speed and accuracy of step performance, may beneficially allow the process optimizing module 219, discussed below, to analyze categories for commonalities and provide suggestions. For example, the optimizing module 219 may analyze "ideal" examples and suggest optimized tool placement or motion profiles, part placements and orientations, etc. to improve efficiency or reduce the risk of repetitive stress injuries. As another example, the optimizing module 219 may analyze "terrible" examples and suggest actions. For example, retraining of a particular individual who is underperforming, inspection of a particular tool for wear/breakage or assembly parts to make sure they meet spec, because, e.g., the driving of bolts at a station is taking longer than anticipated.

In some implementations, the labeling module 211 generates a subset of labels based on manual user input and a subset of labels automatically. In some implementations, the labeling module 211 generates the subset of labels based on manual user input (e.g., via a client device) labeling of a set of training image data during a training period. The user-input labels obtained by the labeling module 211 may vary based on the implementation and/or use case (e.g., moving process or fixed process). Examples of labels the labeling module 211 may prompt a user for and receive may include, but are not limited to one or more of a start frame, an end frame, an area of interest, a set of key point(s), an identifier, etc.

In some implementations, the labeling module 211 receives user input identifying a step, e.g., by name or a number. For example, in some implementations, the labeling module 211 may present a number of recordings of a worker performing one or more steps, and for each of the recordings, receives, from the user, labels identifying the step(s) (e.g., "drive bolt 1", "drive bolt 2," etc.).

In some implementations, the labeling module 211 receives user input identifying a start frame and an end frame in an example instance (or set of example instances) of a step recorded by the camera device 152. For example, in some implementations, the labeling module 211 may present a number of recordings of a worker performing one or more steps, and for each of the recordings, receives, from the user, labels identifying the start frame (e.g., the frame where the worker begins driving bolt 1), and the end frame (e.g., the frame where the bolt 1 is seated).

In some implementations, the labeling module 211 receives user input identifying a set of key points of interest (e.g., right wrist, left wrist, or both wrists) in an example instance (or set of example instances) of a step recorded by the camera device 152.

In some implementations, the labeling module 211 may receive, from the user, user-input labels identifying one or more areas of interest. Examples of areas of interest may include, but are not limited to, a bounding box around a workpiece, pick area (i.e., an area where parts are components are kept that are picked up/retrieved), a walk area, i.e., an area where the monitored worker may walk (e.g., between the workpiece and a pick area)), and a pitch. For example, in some implementations, the labeling module 211 may receive, from the user an identification of a first bounding box around the workpiece (e.g., in the start frame), a second bounding box around the workpiece (e.g., in a frame half way through performance of the step/cycle), and third bounding box around the workpiece (e.g., in the end frame). In another example, in some implementations, the labeling module 211 may receive, from the user, an identification of a first polygon identifying a pick area (e.g., where the user picks up the bolts to be driven) and a second polygon identifying a walk area (e.g., an area between where the worker picks up the bolts and where the worker drives the bolts). It should be recognized that use of the "walk area" label may reduce issues created by other people or objects appearing within the field of view of the camera, but outside the area, and may also be used to distinguish worker movement where the worker is on a conveyor and not actual walking. In yet another example, in some implementations, the labeling module 211 may receive, from the user, an identification of a pitch (e.g., a start of the pitch and end of the pitch label). A moving assembly line is generally split up into a number of stations (e.g., an average its 6-10 feet of the assembly line may be expected in automotive manufacturing, but it may vary based on the product size and movement speed of the line). The pitch is where a set of steps on a moving process is supposed to take place.

In some implementations, manual user-input based labeling occurs prior to training and deployment, and the labeling module 211 may automatically label future instances of a step after training and deployment. For example, after training, a factory worker drives bolt 1, and the labeling module 211 automatically generates a "drive bolt 1" label and labels the factory worker's performance in that instance as "ideal."

In some implementations, the labeling module 211 generates a subset of labels automatically. For example, when a first instance of process cycle has already been manually labeled by a user (e.g., indicating beginning and end frames for each step, the step identifier, key points of interest); in some implementations, the labeling module 211 automatically labels a second, training instance to expedite the labeling process during training, and the user may (optionally) review and modify those labels, which were automatically assigned, when correction is needed. It should be recognized that this may alleviate the cold start problem and may quickly create a great number of labeled sets for training in less time and with little human effort. In another example, in some implementations, the labeling module 211, after the process monitoring algorithm is deployed, automatically generates and labels the factory's performance of a cycle as "ideal," because all steps were performed and a time threshold was satisfied (e.g., a threshold based on an average or median number of seconds to perform that cycle).

In some implementations, the labels generated by the labeling module 211 are used by the image extraction module 209 to train one or more of the pose estimator and object detection. In some implementations, the labels generated by the labeling module 211 are used by the process monitor module 213 to train the process monitoring module 211. In some implementations, labels associated with video received during deployment are not used by the process monitoring algorithm; however, in some implementations, the labels automatically generated and applied, by the labeling module 211, to video received during deployment are used by one or more of the tracing module 217 and the process monitoring module 219. For example, the auto-generated labels may be used to determine time spent on a work piece by a worker in a cycle, time spent in a pick area per cycle which is also known as the. "pick time," time spent by an operator walking in a cycle, which is also known as the "walk time," the cycle time (i.e., the sum of the time spent on work piece, pick time, and walk time), a time-per-step, whether step(s) are completed in within the designated pitch, etc.

The process monitor module 213 trains and applies a process monitoring algorithm in order to monitor an assembly (or other physical) process. In some implementations, the process monitors the process to (1) determine a step being performed, (2) determine whether all steps were performed, (3) determine whether a step is performed out of order, (4) identify a skipped step, (5) identify a step performed out of order, or (6) a combination of one or more of the foregoing.

As described above, the image extraction module 209 performs extraction on video data (e.g., applies pose estimation) and the labeling module 211 applies labels. In some implementations, the process monitor module 213 receives the video frames associated with one or more steps of a process (e.g., based on the start and end frames labeled for a step), receives the video extraction data (e.g., the pose estimation data and object(s) detected) corresponding to the one or more steps, and trains one or more process monitoring algorithms based on those two sets of data.

In some implementations, a process monitoring algorithm is trained for each step identified via the labeling. In some implementations, a single process monitoring algorithm is trained. In some implementations, the single process monitoring algorithm may not be used for the whole process (e.g., the whole assembly beginning-to-end of a transmission), but may be used for the whole process visible to a particular camera or set of cameras (e.g., the 4 steps of the transmission assemble performed on an assembly line within the field of view of a particular camera device 152a).

The process monitoring algorithm(s) trained may vary depending on the implementation. For example, a process monitoring algorithm may be an algorithm generated using supervised, semi-supervised, or unsupervised machine learning depending on the implementation. Supervised machine learning methods include a gradient boosted tree, a random forest, a support vector machine, a neural network, logistic regression (with regularization), linear regression (with regularization), stacking, naive Bayes, linear discriminant analysis, k-nearest neighbor, similarity testing, and/or other supervised learning models known in the art. Unsupervised machine learning methods include clustering (e.g. hierarchical, k-means, mixture models, DBSCAN, OPTICS algorithm, etc.), anomaly detection (e.g. local outlier factor), neural networks (e.g. autoencoders, deep belief nets, Hebbian learning, generative adversarial networks, self-organizing map, etc.), and approaches for learning latent variable models expectation-maximization algorithm, method of moments, blind signal separation, etc.), and/or other unsupervised learning models known in the art. Semi-supervised machine learning methods include generative models, low-density separation, graph-based methods, heuristic approaches, and/or other semi-supervised learning models known in the art.

For clarity and convenience, particular methods (e.g., use of neural networks) are discussed herein. However, it should be understood that these are examples and that other learning methods may be used, and are within the scope of this disclosure.

Before addressing specific example implementations for fixed and moving processes and statistics-based and deep learning-based algorithms, it may be beneficial to describe the process monitor module 213 at a higher level of abstraction. The process monitor module 213 receives extracted video information (e.g., pose data) generated from an incoming image stream (e.g., a video) and generates a belief regarding what step is being performed, and whether a step end is detected. For example, during deployment in a factory a worker is videoed driving a bolt. That video may be fed live into the image extraction module 209, which outputs extracted video data. The process monitoring module 213 obtains the extracted video data. Based on the extracted video data, the process monitor module 213 determines what step the process monitoring module 213 believes is being performed (e.g., driving bolt 1, as opposed to driving bolt 2) at time 1. As video of the bolt being driven continues to be received and processed by the image extraction modules 209, the process monitor module 213 uses this new extracted video data to update its belief at time 2. The periodic updating of the belief may vary based on the implementation (e.g., every frame, every 5 frames, every 10 frames, every X milliseconds, etc.). When the process monitor module 213 determines a possible step end is present, the process monitor module 213 makes a determination whether the step has occurred, and, if so, updates a belief of the step completion and step frame number.

It should be recognized that the systems and methods herein provide an accurate real-time determination about what step is occurring and whether the step is completed. Therefore, the system and methods describe herein present a worker with alerts (e.g., step out of order or skipped step) in real-time so that corrective action may be taken if needed. Accordingly, the system and methods described herein may immediately improve the process by providing timely feedback to reduce errors and is not merely an ex post facto analysis, or post mortem, of a worker's past performance.

Figure 4:
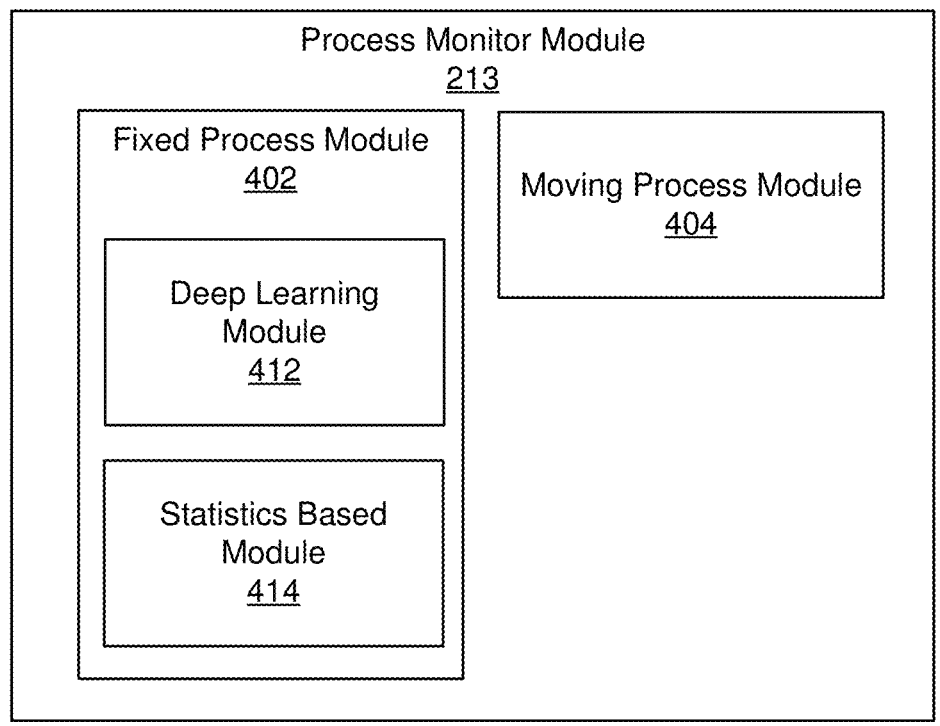
FIG. 4 is an example block diagram illustrating a training process according to one implementation.

The process monitoring module 213, as described above, may be used to monitor fixed processes (e.g., those occurring a stationary workbench), moving processes (e.g., those occurring on an assembly line or conveyor, which moves intermittently or continuously), or both. However, for clarity and convenience, a more detailed discussion is provided with reference to FIG. 4. FIG. 4 is an example process monitoring module 213 illustrated according to one implementation. In the illustrated implementation, the process monitoring module 213 includes a fixed process module 402 and a moving process module 404.

The fixed process module 402 trains and applies a process monitoring algorithm in order to monitor a fixed assembly (or other physical) process (e.g., an assembly process at a stationary workbench and/or where the workpiece is stationary while the steps are being performed). As discussed above with reference to the process monitoring module 213, the process monitoring algorithm may be generated using different learning methods or combinations thereof, depending on the implementation. However, for clarity and convenience, a couple methods, namely deep learning (using recurrent neural networks or transformers) and a statistics-based method are described below. Accordingly, the fixed process module 402, in the illustrated implementation of FIG. 4, includes a deep learning module 412 and a statistics-based module 414.

In some implementations, the deep learning module 412 has the ability to learn, in a supervised or unsupervised way, models of objects. In one such implementation, models of objects have 2 main components—appearance and behavior. The appearance can be coupled with a rotation to allow for different perspectives, distances, and types. In some implementations, the behavior is split into either different objects or different modes. To explain by example, a car driving straight or making a left turn—either that is two different modes of the same object, or two different objects.

In some implementations, the deep learning module 412 includes embedded code that defines or selects a model. A discriminator (not shown) within the deep learning module 412 selects/outputs embedding codes based on a time series of images. In some implementations, this provides a way to account for the creation of new models and not just updates of existing models.

The deep learning module 412 generates correlation values with other models/embedding codes, which allows the learning to recognize that there are objects that appear again and again.

It should be recognized that unsupervised learning has the ability to learn appearance in a local way—visually similar objects are learned to be similar. Supervised learning pushes those embeddings to be closer together, using information human labelers have that may not be obvious from the image alone, thereby using behavior to push the embeddings closer together.

Behavior can be learned, by the deep learning module 412, by watching objects change over time in a video stream. When similar appearing objects are clustered together (across frames) then their trajectory can be learned by the deep learning module 412. The first order approximation of behavior is linear motion at each discrete step, i.e., optical flow or velocity. More complex trajectories may be learned depending on the similarity the appearance embedding encodes (which allows better tracking through time).

It should further be recognized that, while the deep learning is discussed here with reference to a fixed process (as the deep learning module 412 is a sub-module of the fixed process module 402 of FIG. 4), the deep learning methods discussed herein may be applied to a moving process as well. However, for the sake of brevity, a separate description of deep learning for a moving process is not provided below with regard to the moving process module 404.

In some implementations, the deep learning module 412 uses recurrent neural networks (RNN) (including types like GRU and LSTM). The RNN is trained on examples of process steps. Feeding an image, sequentially, the network would output which process was being completed. The RNN may use pose data or other higher-level data than the image as input depending on the implementation. In some implementations, the deep learning module 412 uses transformers. Similar to RNNs, a transformer-based model would be fed a sequence of images or pose data and output a process step. Both deep learning methods (i.e., RNN and transformers) may encode the sequential data into an embedding that is used by a decoder network to output the completion of process steps.

Such deep learning would propose 'models' for objects used by people in the scene, and models for the people as well. These models may allow the system 100 to compare predictions (what should happen during a process step) and what happens, to increase confidence of process step or alert when a process is not being followed. Additionally, the system 100 could show confidence of step completion, creating an output of steps completed, when they were completed, and confidence the step was done correctly (similar to the statistics-based process monitoring described below).

The statistics-based module 414 trains and applies a statistics-based process monitoring algorithm to monitor a process. In some implementations, the statistics-based module 414 receives the recorded examples with the labeled end-points.

The statistics-based module 414 may generate path points by tracking posed data based on the active key point(s) (e.g., left wrist). The statistics-based module 414 combines this pose data into a statistical average of points, where the points are separated by some number of pixels and have different probabilistic models like Gaussian, Poisson, Beta among others, along the x and y dimensions. The statistics-based module 414, by comparing these statistical points to the pose data from a test process determines the likelihood that someone is following the same path.

The statistics-based module 414 may generate endpoints, which are where the pose data ends as the step is accomplished. An example is screwing a bolt with a torque wrench—the wrist will pause for a few seconds as the bolt is screwed in, giving an indication that the worker has paused. These endpoints are used to discriminate between steps that are far apart in the canvas of the image.

The statistics-based module 414 may compare similarity of endpoints. Endpoints for different steps that are located very close together may be grouped in such a way that they can be estimated based on other factors, such as which step was completed previously, what tool is being used and what time in the cycle of steps.

The statistics-based module 414 may determine frame length. Frame length is analogous to dwell time in an endpoint—as someone screws in a bolt, they might spend 2 seconds at that endpoint. When they perform another task, such as clip in a plastic part, they might spend 0.5 seconds. This is another signal the statistics-based module 414 may use to help discriminate which step is being done.

The statistics-based module 414 may determine an incoming or outgoing direction. The direction an endpoint is entered and the direction it is left may be indicative of which step is being done, as well as which step was done prior and which step is to be done next.

The statistics-based module 414 may determine step order. Step order may be a signal that is useful to identify which step is being performed. However, step order may also be a signal that may be ignorable in some contexts (e.g., because the order is not critical). In some implementations, the order of the steps performed vs the job instructions/training order is compared, and workers are notified when they are not following the standard of work. Typically, it is more important to know if a worker skipped a step completely, than if it was done out of order. Generally, it is not desirable to shut down a line because a step was out of order.

The statistics-based module 414 may utilize object detections, for example to determine whether a tool such as a drill, wrench, screwdriver, etc. is present. As the presence of a tool may be indicative of what step is being performed.

In some implementations, the statistics-based module 414 combines and weights one or more of the foregoing (path points, endpoints, similarity of endpoints, frame length, incoming and/or outgoing direction, and step order) to make a decision periodically about which step is being performed and whether it has been completed. In some implementations, once a process has been completed or time has elapsed, the information is sent to the gateway or cloud API to be processed.

The weight and methods of combining these pieces of information depends on the process and may be tuned. For example, a user setting up the process monitoring may be presented with a user interface by which he/she can modify the combination and/or weightings. The complexity of the user interface may vary from simple (e.g., a single slide bar) to complex (e.g., showing various weightings, velocity thresholds for determining whether something is moving or has stopped, distance thresholds for determining whether a key point is sufficiently "close" to an endpoint, etc.). The variation may be based on the implementation or based on the user's selection (e.g., selection of "advanced").

The moving process module 404 uses the movement of the process to help segment the steps. In some implementations, the labeling applied via the labeling module 211 includes bounding boxes. For example, in some implementations, the labeling module 211 labels bounding boxes for one or more of a step, a start frame, and an end frame. In some implementations, the labeling module 211 may also label a key point on the object being assembled at two points (e.g., a beginning and end) of a step.

Depending on the implementation, the moving process module 404 may compensate for the movement of a workpiece in a moving process in a number of ways. In some implementations, the moving process module 404 compensates for the movement by normalizing movement relative to the workpiece, i.e., the frame of reference becomes the workpiece (not, e.g., the visual field of the camera), and movement may be defined relative to the workpiece. It should be understood that such implementations may better detect (or not penalize) detection of a step performed further up, or down, the line than they occur in training instances.

In some implementations, the moving process module 404 uses key points (e.g., those associated with a human's wrist) within the bounding boxes and builds a two-dimensional heat map or gaussian. The 2D heatmap or gaussian captures movement, because steps with low movement (e.g., drilling) have strongly clustered points, whereas high movement steps (e.g., torqueing a wrench) have spread out points.

In some implementations, the moving process module 404 determines a dominant vector of movement. For example, the moving process module 404 uses two labeled points that are associated with feature X in frame 10 and feature X in frame 200, and generates a dominant vector of movement based on those two points.

Using the vector of dominant movement and the frame length, the moving process module 404 may compare the last N pose points seen with the labeled examples received during training. This comparison can be performed at different intervals (e.g., every frame, every 5 frames, 10 frames, 20 frames, etc.) depending on the implementation.

Figure 5:
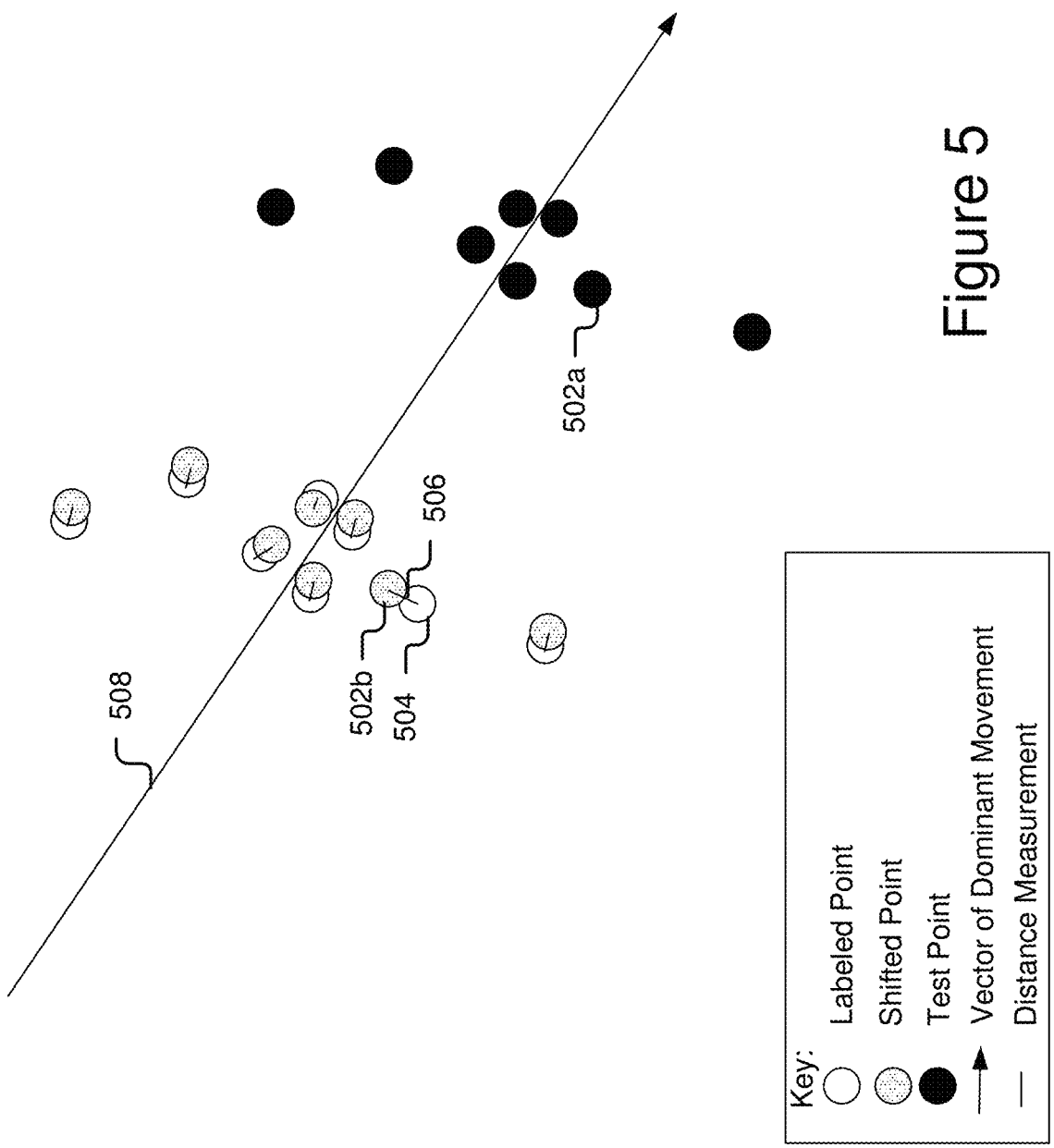
FIG. 5 is an example illustration representing a normalization and shift for a moving process according to one implementation.

Because the piece being assembled during deployment is moving and may or may not be in the same place as the piece that was assembled during training and/or the camera may be bumped or shift during deployment, the moving process module 404 applies a normalization so that steps performed some margin (e.g., a foot before or after) from where the step was performed during training are not penalized and are correctly identified. Referring to FIG. 5, in one such implementation, the moving process module 404 normalizes the positions of the N pose points relative to the vector of dominant movement 508 by calculating a mean line that is perpendicular to the dominant vector of movement, and then shifting the test points' mean line perpendicular to the dominant vector of movement (i.e. the test points extracted from video taken while testing the algorithm or during deployment of the camera) to the labeled example's mean line perpendicular to the dominant vector of movement (i.e. the labeled examples received and labeled during training). For example, referring to FIG. 5, point 502*a* is shifted to the location of point 502*b*.

The moving process module 404 performs similarity scoring between the step presently being performed and captured on video to those steps captured during training. The similarity scoring may vary (e.g., depending on implementation, use case, user selected criteria, etc.) Examples of similarity scoring include similarity of angle of the forearm (vector between elbow and wrist key points), distance from 0 shifted (e.g., things that appear closer to where they are expected to occur based on training example of a step are more likely to be the same step), etc.

In some implementations, the moving process module 404 applies a decision criterion to determine which step is being performed and whether the step is completed. In some implementations, the decision criteria include a threshold, e.g., based on a summed score for a set of points. In some implementations, the moving process module 404 pairs off points that are closest (as until no points remain in either the test set (generated from step being performed) or labeled set (generated from performance of step X during training). For example, the moving process module pairs point 502*b* with point 504. In some implementations, the moving process module 404 then calculates the distance between the paired points, e.g., points 502*b* and 504, which is illustrated by line 506. The distance calculations for each point pair are summed, by the moving process module 404, and when the summed value (i.e., a similarity score) is below a threshold, the moving process module 404 determines that step X is performed and complete. Please note that while "distance" calculations are described. In some implementations, the system may use displacement calculations.

In some implementations, when the moving process monitor 404, or the process monitor module 213, determines a step is complete, the labeling module 211 applies a completed step flag. The completed step flag is associated with a frame number and can be used to calculate the step time, and total cycle time. These times may be used by one or more components of the system. For example, the labeling module 211, in some implementations, may use the times to apply a "good" label, which the process optimization module 219 may use to generate suggested optimizations. In another example, the optimization module 219, in some implementations, may analyze instances that take less than a threshold amount of time to generate suggested optimizations without need of labeling them as "good."

In some implementations, the process monitor 213 or a subcomponent therein may generate and send an alert. For example, the process monitor module 213 may generate one or more of a "skipped step" alert or a "step out of order" alert to a worker, e.g., via an electronic display at the worker's work station. As another example, the process monitor module 213 may generate alerts with labels, e.g., "good" to provide immediate feedback to the worker. In some implementations, the alert may not be via display or solely for display. For example, a red light may be flashed or the line paused or stopped as part of a "skipped critical step" alert. In some implementations, the alerts generated and/or sent may be customizable. For example, it may desirable only to alert worker of a skipped "critical" step, while elsewhere in the process (or in a different factory) it may be desirable to alert a worker of any skipped step. As another example, it may be desirable to provide "good" and "bad" labels during a worker's training period or the first several cycles of the worker interacting with a new workpiece or performing new/unfamiliar steps to help the worker learn, but to phase that out so the worker is concentrating on the job work piece, rather than a display, after a predefined number of cycles. It should be recognized that the alerts and customizations herein are merely examples and others exist and within the scope of this description.

Presently, existing systems rely on regular security cameras installed across the facility. However, because a lot of bandwidth and equipment is needed to handle many camera feeds and a great deal of central storage is needed to store the footage, such systems are very expensive to deploy and use cameras sparingly and, therefore, have only partial visibility into the operations. When a problem happens today, plant operators go and watch the footage for each camera and try to match the video to different instances (e.g., different cars) so they can find which one was affected and the cause. This typically involves spending hours searching through video footage to identify a cause.

The tracing module 217 provides a visibility and traceability system for manufacturing facilities. In some implementations, the tracing module 217 provides a search engine for manufacturing facilities that integrates with the manufacturer's existing manufacturing execution system(s) (MES) to be the video system of record for all products built in the facility.

The search engine provided by the tracing module 217 may vary depending on the implementation. In some implementations, the search engine receives one or more of a time period and an identifier. Examples of an identifier include, but are not limited to, one or more of a unit identifier (e.g., chassis number, serial number, VIN number, barcode, QR code, etc.), a product identifier (e.g., make, model and trim), a worker (e.g., employee or robot ID), a workstation identifier (e.g., work bench a), etc. Examples of time period include one or more of a recent time period (e.g., last hour, last shift, last day, last 3 days, last 5 days, last week, last 2 weeks, last month, last 3 months, last quarter, year-to-date, etc.) and a custom time period (e.g., presenting a calendar and/or clock and allowing the user to query a specific time period, such as from 3 PM on Tuesday, Sep. 15, 2020 to Noon on Thursday, Sep. 24, 2020.)

In some implementations, responsive to a query, the search engine presents a set of query results. The presentation of the query results may vary based on one or more of the implementation and user-selected options. For example, a result search for a given product type (e.g., 2WD transmission) over a period may be presented as a list of video clips from camera devices at work stations that worked on that product type (i.e., 2WD transmission in this example). Those results may be sorted chronologically based on timestamps from the video, grouped by product ID (e.g., so that all clips for 2WD transmission A are presented or together), grouped by worker or workstation, etc.

In some implementations, metrics are presented with, or as part of, a query result set. For example, assume that the search was for 2WD transmissions in the last 24 hours, in some implementations, the tracing module 217 may present for display metrics regarding average step times, average cycle times, number of faults (e.g., skipped steps, line stoppages, etc.) in the last 24 hours. As another example, when a video clip associated with the result set is selected, so that the user may view the recorded video, supplemental metrics may be presented (e.g. time it took the worker in the recording to perform the step(s) or cycle recorded, statistics for the recorded worker to complete the step(s) or cycle (e.g. box plot showing the worker's performance distribution for the step or cycle, a box plot showing performance distribution across all workers, etc.), a label (e.g. "Good"), detected faults (e.g. "failed to drill bolt 3"), suggestions (e.g. move drill to left-hand side of table and have worker drill with left hand), etc.

In some implementations, the tracing module 217 integrates with one or more of a manufacturer's data acquisition and storage system(s). Examples of data acquisition and storage systems include, by way of example and not limitation, programmable logic controller (PLC) controllers, a manufacturing execution system (MES), an enterprise resource planning (ERP) system, a supervisory control and data acquisition (SCADA) system, etc. Via the integration, the tracing module 217 obtains data for each assembly workstation on the floor. Examples of the data obtained include, by way of example and not limitation, a product type being built (ex: hybrid, 2WD, All Wheel Drive, etc.), a start time of the product appearance at the workstation, extra product specific data required by the customer (like vehicle type for the associated product being built), etc.

The tracing module 217 integrates with the camera devices 152a-n. In some implementations, the tracing module is server based. For example, the tracing module 217 is included on a server 162 (not shown) and integrates with the camera devices 152a-n via the network 150. In some implementations, the tracing module 217 is included in the camera devices 152a-n and communicate and cooperate to provide the features described herein. In some implementations, the tracing module 217 includes sub-components distributed between a server 162 (not shown) and the camera devices 152a-n, which cooperate to provide the features and functionality described herein.

The camera devices 152a-n include in-built video storage (e.g., memory 206 and/or databases 208) and processing (e.g., processor 204) to document the work being done on every product and to auto-index the data for the stakeholders (e.g., plant managers, supervisors, process engineers, etc.). In some implementations, the in-built video storage is 1 TB. In some implementations, the in-built storage is sufficient to store 30 days of high-definition video and an additional 30 days of low-resolution video. In some implementations, older video data is archived. For example, after 30 days, high resolution video is down-sampled into low-resolution video, and after another 30 days, the low-resolution video is archived off camera device 152 (e.g., on a network accessible storage device). In some implementations, video is overwritten as the in-built video storage is filled. For example, assuming the video storage stores 30 days of video, on day 31, the video begins to overwrite the video stored on day 1 (i.e., overwritten in a first-in-first-out manner).

In some implementations, using web dashboard provided by the tracing module 217, stakeholders can enter the unique ID for a product (ex: body number) into a search bar, and the tracing module 217 receives the query and provides associated video data, which is automatically fetched for the appropriate time from each camera deployed in the facility, so that the manufacture of that product may be viewed beginning-to-end.

In some implementations, the tracing module 217 is not merely limited to queries based on a unique identifier associated with a workpiece. For example, depending on the implementation, the tracing module 217 may enable queries regarding one or more of a particular work station, particular worker, a particular product or unit identifier, particular pose or movement (e.g., a query to identify where workers are required reach overhead or behind themselves or to lift and twist, or how many times they perform such actions, etc.). In one implementation, the tracing module 217 may identify a reach based on pose data, e.g., based on a distance between a wrist key point and a shoulder key point, which may, in some implementations, be compared relative to a sum of the distance from the shoulder key point to the elbow key point and the distance from the elbow key point to the wrist key point. In one implementation, the tracing module 217 may identify a bend, lift, or stoop based on pose data, e.g., based on a distance between a hip key point and a shoulder key point.

Given the in-built video storage and processing of the camera devices 152a-n, manufacturers may deploy hundreds or even thousands of cameras given the lower equipment and IT costs/burdens, which provide a manufacturer greater traceability and visibility into the products built in their facility.

The process optimizing module 219 analyzes the data obtained by the camera device 152 or generated by the assembly monitoring module 203 or its subcomponents to generate insights.

For example, using movement data describing movement of the person, how much time they spend on each step, time on the overall cycle, time "wasted" between cycles, pick time, walk time, where on the pitch a step begins and ends, the process optimizing module 219 may determine if they are under or over worked and where he/she tends to make errors. For example, when a beginning of a pitch in a moving process is associated with a "0" and the end of the pitch is associated with a "100," when a worker consistently starts (e.g., at −12) and/or ends early (e.g., at 70), it may indicate the worker is under worked (e.g. not enough tasks/the line is moving too slowly in that section, etc.) or highly efficient, and when a worker is consistently completing tasks outside the pitch (e.g. at 108) it may indicative of a problem, e.g., the worker is overworked, inefficient, a process is more complex and time consuming, the worker is consistently having to correct or deal with upstream issues, etc. The process optimizing module 219 may auto generate insights. For example, moving 2 steps from station 3 to station 2 would be beneficial because station 3 operator is always overworked and station 2 operator has 45 seconds free in between every cycle which is a lot of wasted time.

The labeled examples used for training are the ground truth and, in some implementations, the human may enter other ground truth values like how much time on average they should be "free" in between cycles so that the process optimizing module 219 may benchmark against that and average out to see where optimizations are possible.

The process optimizing module 219 may provide insights in addition to, or instead of, improvements. For example, in some implementations, the process optimizing module 219 surfaces the best practices, which may identify an operator may have found a better (but non-standard) way to do it so this technique needs to be adopted by others. Alternatively, the process optimizing module 219 may surface operators who are performing tasks unsafely, so that the behavior may be stopped. Both of those can be surfaced by the same mechanism described above. Using the orientation of the objects and/or the pose of the users, the process optimization module may tell if the tool is being used correctly and ergonomically, and suggest changes.

Other examples of the types of insights the process optimizing module 219 may surface include (1) identify if using the left hand is more optimal for a specific process or workstation instead of reaching further using the right hand; (2) identify which if steps can be moved around in between continuous work stations on an assembly line for more efficiency; and (3) moving steps to balance workload (e.g. station 1 has 5 steps and is done very quickly while station 2 has 12 steps and takes very long—an insight that recommends moving steps from station 2 to station 1 to balance out the workload may be generated).

Example Methods

Figure 6:
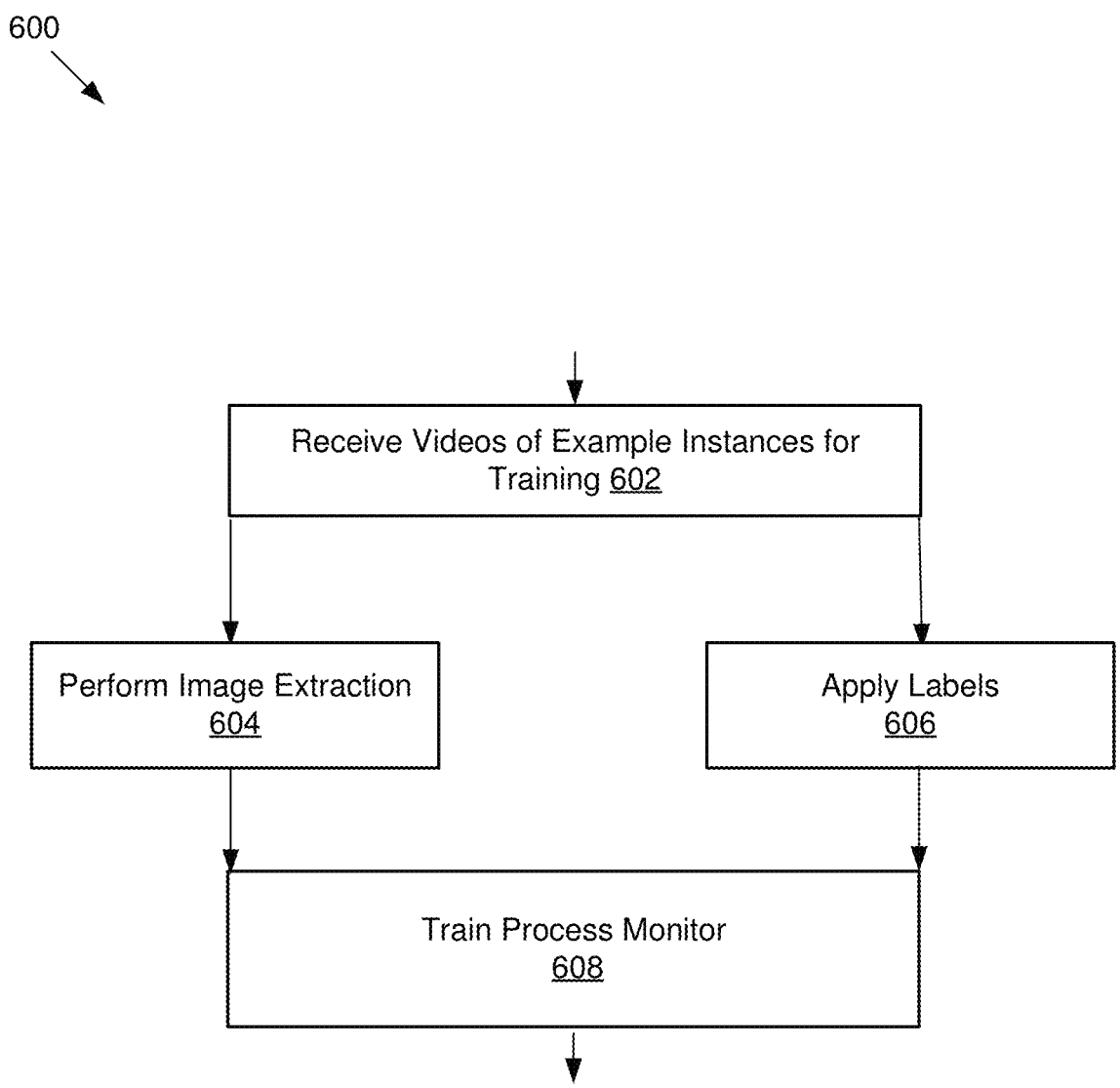
FIG. 6 is a flowchart of an example method for generating a process monitoring algorithm according to one implementation.

FIG. 6 is a flowchart of an example method for generating a process monitoring algorithm according to one implementation. At block 602, videos of example instances are received for training by the image extraction module 209 and the labeling module 211. In some implementations, each video represents an example of a workpiece going through one or more (common) steps associated with the process to be monitored.

Blocks 604 and 606 are illustrated in parallel, but may be performed in series, depending on the implementation. At block 604, the image extraction module 209 performs image extraction. For example, the image extraction module 209 extracts pose data and/or detects objects. At block 606, the labeling module 211 applies labels to the video of example instances. In some implementations, at least one set of labels (e.g., a set identifier, a start frame, an end frame, and any other labels used in the particular implementation, which may include one or more areas of interest, one or more key points, etc.) is received based on human user input labeling a video of an example instance. In some implementations, other sets of labels may be received based on user input, i.e., by the user labeling more than one video, or may be automatically generated by the labeling module 211 based on the user-input labels. At block 608, the process monitoring module 213 trains a process monitoring algorithm using the image extraction data generated at block 604 and the labels applied at block 606.

Figure 7:
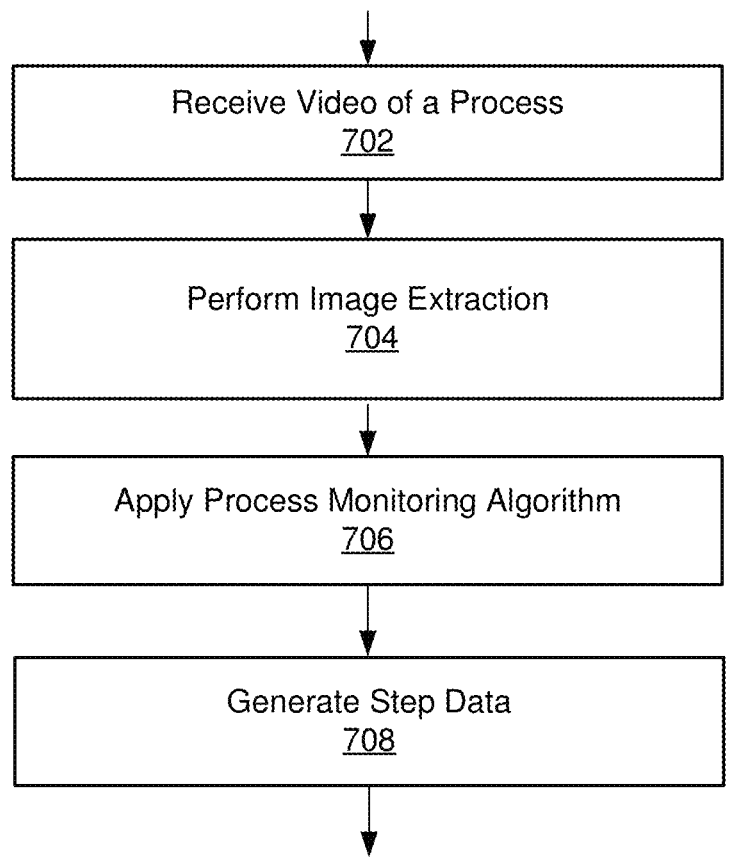
FIG. 7 is a flowchart of an example method for monitoring a process according to one implementation.

FIG. 7 is a flowchart of an example method for monitoring a process according to one implementation. At block 702, video of a process is received by the image extraction module 209 and the process monitoring module 213. For example, live video of a new instance of a workpiece undergoing the process being captured by the camera device 152 is received by the image extraction module 209. At block 704, the image extraction module 209 performs image extraction on the video received at block 702. For example, the image extraction module 209 periodically, e.g., every x frames or y milliseconds, generates pose data and detects objects. At block 706, the process monitor module 213 applies the process monitoring algorithm and, at block 708, generates step data. For example, the process monitor module 213 generates step data such as an identification of which step the process monitor module 213 believes is being performed, whether the step is complete and, depending on the implementation, may include one or more of a relevant label, alert, or suggestions (e.g., step skipped alert, step performed out of order alert, improper posture alert, "keep your back straight," "ideal," etc.).

Figure 8:
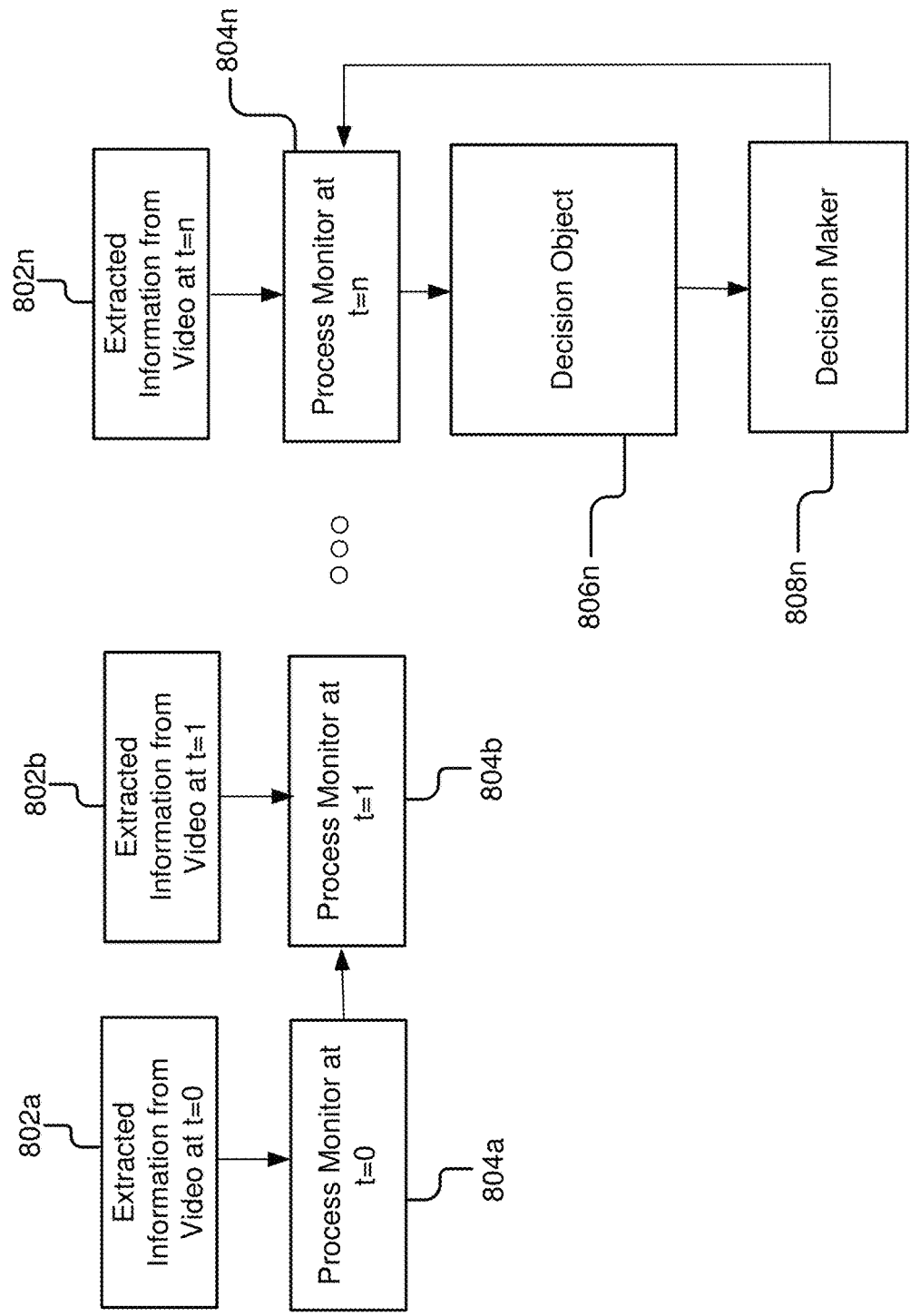
FIG. 8 is a flowchart illustrating another example method of monitoring a process according to one implementation.

FIG. 8 are flowcharts illustrating another example method 800 of monitoring a process according to one implementation. At block 802a, the image extraction module 209 provides extracted information from a video at a time zero to the process monitor 213. At block 804b, the process monitor 213 receives the extracted information for time zero and makes a decision. At block 802b, the image extraction module 209 provides extracted information from a video at a time one to the process monitor 213. At block 804b, the process monitor 213 receives the extracted information for time two and makes updates the decision(s) made by the process monitor at block 804a. As video continues to be received, blocks 802 and 804 are repeated, as indicated by the ellipsis between blocks 802b and 804b and blocks 802n and 804n.

In some implementations and use cases, multiple workpieces and/or work stations may be visible within the camera device's field of view. In some implementations, the process monitor 213 decides, at block 806n, an object. For example, the process monitor determines one or more of which of multiple visible workpieces is being worked on, or should have its associated state updated, and what, if any, tools are present. At block 808n, the process monitor 213 makes a decision, which may be output as step data. For example, process monitor updates a belief (e.g., a state of an object) of what step is being performed and whether that step is complete. As illustrated by the arrow from block 808n to 806n, the belief, may be returned to block 803n, so that it can be subsequently use and/or updating at a time n+1 (not shown). While not illustrated, it should be understood that blocks analogous to blocks 806n and 808n may exist for time zero and time one.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving, using one or more processors, image data, the image data including a first training video representing performance of one or more steps on a first workpiece;
   applying, using the one or more processors, a first set of labels to the first training video based on user input;
   performing, using the one or more processors, extraction on the image data, thereby generating extracted information, the extracted information including first extracted image information associated with the first training video; and
   training, using the one or more processors, a process monitoring algorithm based on the extracted information and the first set of labels.

2. The method of claim 1, wherein applying the first set of labels to the first training video based on user input further comprises:
   receiving, from a user, a plurality of bounding box sets, wherein each bounding box set is associated with a single workpiece, the first set of labels including a first bounding box set;

training an object detection algorithm based on the plurality of bounding box sets, wherein the extraction includes applying the object detection algorithm, and the extracted image information includes an object detection.

3. The method of claim 2, wherein the first bounding box set comprises a first bounding box around the first workpiece in a start frame, a second bounding box around the first workpiece in an intermediate frame, and a third bounding box around the first workpiece in an end frame, wherein training the object detection algorithm includes applying a deal learning object detection network.

4. The method of claim 2, wherein the first bounding box set represents a first workpiece at a beginning, at an intermediary stage, and at an end of a cycle in a camera device field of view.

5. The method of claim 1, wherein applying the first set of labels to the first training video based on user input further comprises:
receiving, from a user, a set of polygons, wherein the set of polygons includes one or more of a pick area polygon, a walk area polygon, and a pitch polygon, the first set of labels including the set of polygons.

6. The method of claim 1, wherein performing extraction on the image data generates one or more of pose data and an object detection.

7. The method of claim 1, wherein the set of labels comprises a start frame label associated with a frame in which a step begins, an end frame label associated with a frame in which the step ends, and a step identifier identifying the step.

8. The method of claim 1 further comprising:
automatically applying a second set of labels to second training video image data based on the first set of labels, the first set of labels applied based on user input,
performing extraction on second training video image data, thereby generating second extracted information, the training video image data including the second training video image data; and
wherein the training of the process monitoring algorithm is further based on the second extracted information and the second set of labels.

9. The method of claim 1 further comprising:
subsequent to training the process monitoring algorithm, receiving live video image data;
performing extraction on the live video image data, thereby generating live video extracted information;
applying the process monitoring algorithm to the live video using the live video extracted information; and
presenting step data.

10. The method of claim 9, wherein performing extraction on the live video image data comprises obtaining pose data and an object detection, wherein applying the process monitoring algorithm and presenting the step data comprises:
applying the process monitoring algorithm to first live video extracted data associated with a first time and generating a first belief;
presenting first step data including the first belief, the first belief including a step identifier and whether the step is complete;
applying the process monitoring algorithm to second live video extracted data associated with a second time and generating a second belief by updating the first belief; and
presenting second step data including the second belief.

11. A system comprising:
one or more processors; and
a memory storing instructions that, when executed by the one or more processors, cause the system to:
receive, image data, the image data including a first training video representing performance of one or more steps on a first workpiece;
apply a first set of labels to the first training video based on user input;
perform extraction on the image data, thereby generating extracted information, the extracted information including first extracted image information associated with the first training video;
train a process monitoring algorithm based on the extracted information and the first set of labels.

12. The system of claim 11, wherein applying the first set of labels to the first training video based on user input further comprises instructions that, when executed by the one or more processors, cause the system to:
receive, from a user, a plurality of bounding box sets, wherein each bounding box set is associated with a single workpiece, the first set of labels including a first bounding box set;
train an object detection algorithm based on the plurality of bounding box sets, wherein the extraction includes applying the object detection algorithm, and the extracted image information includes an object detection.

13. The system of claim 12, wherein the first bounding box set comprises a first bounding box around the first workpiece in a start frame, a second bounding box around the first workpiece in an intermediate frame, and a third bounding box around the first workpiece in an end frame, wherein training the object detection algorithm includes applying a deal learning object detection network.

14. The system of claim 12, wherein the first bounding box set represents a first workpiece at a beginning, at an intermediary stage, and at an end of a cycle in a camera device field of view.

15. The system of claim 11, wherein applying the first set of labels to the first training video based on user input further comprises instructions that, when executed by the one or more processors, cause the system to:
receive, from a user, a set of polygons, wherein the set of polygons includes one or more of a pick area polygon, a walk area polygon, and a pitch polygon, the first set of labels including the set of polygons.

16. The system of claim 11, wherein performing extraction on the image data generates one or more of pose data and an object detection.

17. The system of claim 11, wherein the set of labels comprises a start frame label associated with a frame in which a step begins, an end frame label associated with a frame in which the step ends, and a step identifier identifying the step.

18. The system of claim 11 comprising instructions that, when executed by the one or more processors, cause the system to:
automatically apply a second set of labels to second training video image data based on the first set of labels, the first set of labels applied based on user input,
perform extraction on second training video image data, thereby generating second extracted information, the training video image data including the second training video image data; and
wherein the training of the process monitoring algorithm is further based on the second extracted information and the second set of labels.

19. The system of claim 11 comprising instructions that, when executed by the one or more processors, cause the system to:
- subsequent to training the process monitoring algorithm, receive live video image data;
- perform extraction on the live video image data, thereby generating live video extracted information;
- apply the process monitoring algorithm to the live video using the live video extracted information; and
- present step data.

20. The system of claim 19, wherein performing extraction on the live video image data comprises obtaining pose data and an object detection, wherein applying the process monitoring algorithm and presenting the step data comprises:
- apply the process monitoring algorithm to first live video extracted data associated with a first time and generating a first belief;
- present first step data including the first belief, the first belief including a step identifier and whether the step is complete
- apply the process monitoring algorithm to second live video extracted data associated with a second time and generating a second belief by updating the first belief; and
- present second step data including the second belief.

* * * * *